Patented Mar. 22, 1932

1,850,095

UNITED STATES PATENT OFFICE

FRANZ PETER DENGLER, OF CHICAGO, ILLINOIS, ASSIGNOR TO LLOYD M. BROWN, OF CHICAGO, ILLINOIS

EXTRACTION OF OIL FROM VEGETABLE MATERIAL

No Drawing.   Application filed August 2, 1929. Serial No. 383,172.

The present invention relates to an improved process for the extraction of oil from vegetable materials without the necessity of using hydraulic presses or similar oil extractors.

One of the objects of the invention is to treat oil-containing vegetable materials by means of a reagent capable of extracting from the vegetable material some of the bitter principles and mucilaginous constituents which ordinarily interfere with the proper penetration of volatile solvents for the oil and which particularly render the efficient recovery of the volatile solvent from the vegetable material impossible by reason of the fact that the said mucilaginous substance tenaciously adsorbs said solvent and thereby prevents its total recovery, thus occasioning losses and rendering the extraction process unduly expensive.

A further object of the invention is to treat vegetable material containing oil or fat with a reagent that places the vegetable material in such a condition that any volatile solvent subsequently added will rapidly penetrate into the innermost cells of the material, dissolving the fat or oil therein, and also that the said solvent will readily leave the material, carrying the dissolved fat with it. This reagent also has the desirable property of being volatile so that it completely leaves the vegetable material after the treatment so that the same may be used for cattle feed or similar purposes.

Another object of the invention is to treat oil-containing seeds or vegetable materials with ammonium hydroxide which has the property of rapidly penetrating the seeds or vegetable matter and paving the way for the subsequent penetration of volatile solvents of the nature of dichloroethylene, trichloroethylene, carbon tetrachloride, benzene or the like, petroleum naphtha, or ligroin, alcoholether mixtures, etc.

Other objects of the invention will appear from the specification and claims hereof.

Broadly speaking, the invention comprises the treatment of a vegetable seed or other equivalent vegetable material containing fat or oil below the boiling point of water with a dilute solution of a volatile alkali, specifically ammonium hydroxide, followed by superficial removal of the excess moisture either by centrifugation or draining, whereupon the material is subjected to the action of a hot or cold organic volatile solvent whereby the fat or oil is removed from the material, any residual solvent being subsequently recovered by heating the material to drive the solvent therefrom. At the same time such subsequent heating will also drive out the volatile alkali, ammonium hydroxide. There is nothing in the material at the end of the treatment which would tend to adsorb or retain the volatile solvent, as a result of which all of the solvent is expelled and may be recovered practically in its entirety. At the same time the residual fat-extracted material is suitable for further use, such as for example cattle feed.

By the present day method of fat extraction considerable of the fat or oil is left in the material at the end of the treatment and this is often objectionable when the material is subsequently sold for feed as this fat becomes rancid and spoils the taste of the material and renders the same unacceptable to animals. As a specific embodiment of the present invention I will recite how the same is to be applied to soya beans.

The soya bean has usually not been a very acceptable feed material on account of a bitter principle that it contains which appears to have also a scouring effect on animals and therefore can be fed only in limited amounts in admixture with other feed. By applying my present process to soya beans, however, this bitter principle is extracted and the resulting fat-extracted feed is entirely suitable for feeding to animals without any deleterious effects on the latter. In carrying out the present process, soya beans are placed in a closed container and brought first into contact with hot water at a temperature not in excess of 180° F. The mixture of beans and water is kept in motion by agitating the vessel or by keeping the water in motion, as is customary in the decantation method of extraction. In this particular operation the seeds are brought in contact with the hot water for a period of time depending on the type of raw material used, that is to say, depending upon the age of the beans and the particular type, as some of them are more resistant than others, especially if old and dry. However, usually 15 to 20 minutes of treatment with the hot water is sufficient. The action of the water is to effect the swelling of the beans, but the treatment is not continued long enough to allow time to absorb very much water. At the end of the stated period of 15 to 20 minutes sufficient ammonia water (28% strength) is added to bring the ammonium hydroxide content of the entire mixture to a strength corresponding to from ½ to 1% of ammonia water based on the weight of the beans treated. As a guide to the amount of ammonia required it may be stated that 100 pounds of soya beans require about one to two pints of water for each pound of beans, (1 pint of water being roughly equivalent to 1 pound of water), or 100 to 200 pints of water. To this amount of water from one half to one pound of 28% ammonia water is added (this being equivalent to from ½% to 1% on the weight of the beans.) If the beans are old and dry, more ammonia water may be required, and it will be within the scope of the invention to use as much as 5 pounds of 28% ammonia water per 100 pounds of the soya beans. It is possible to use ammonia gas and to blow this into the water where it will be absorbed, although this is very inconvenient and the use of the commercial ammonia water is much to be preferred. If ammonia gas is adopted, this can be introduced at the bottom of the tank into the water, which will rapidly absorb it. When the water smells of ammonia, this will indicate that enough is present to accomplish the purpose of the present invention. This method may hence be used by comparatively unskilled workmen, without any measurement or test other than the smell of the water.

The beans are then kept agitated in this ammonium hydroxide solution at the same temperature, that is not above 180° F., for from 15 to 30 minutes, depending somewhat upon the material and type of apparatus and the degree of agitation possible therewith. During this period the ammonium hydroxide will act upon the bitter principles of the beans and upon the various mucilaginous indefinitely-defined substances in the beans, rendering the said substances soluble and extracting the same from the beans. The ammoniacal liquor is thereupon withdrawn, and the beans, without washing, are heated for a few minutes, or at least for a sufficient length of time to remove the surface moisture thereon. The beans are now found to be quite porous and soft and are then suitable for the next step in the process, which consists in extracting the oil therefrom.

The beans may either be treated as they are or may, if desired, be run through a mill to flake them. In either event the soya bean material is placed into an extraction vessel where it is further heated to remove any remaining surface moisture. The withdrawn ammoniacal liquor is useless and it is drained off into the sewer or otherwise disposed of. This entirely preliminary treatment is carried out at atmospheric pressure.

As soon as the beans have been sufficiently deprived of their surface moisture, the volatile solvent, such as for instance dichloroethylene, trichloroethylene, carbon tetrachloride, benzene or other known volatile fat solvent is applied directly to the soya bean material on the basis of one or two pints of solvent to each pound of raw material, more being used if the fat content is unusually high. This solvent, by reason of the preliminary treatment of the beans and despite the fact that there is moisture therein, will rapidly penetrate the soya bean material and will dissolve the fat or oil therein contained. The particular type of apparatus used is more or less a matter of choice and in any event is well known in the art and is therefore not herein described. The extraction may, for example, be carried out in the rotatory extractor or digester type wherein the solvent is pumped through the material until the same has been substantially freed of its oil or fat content. Usually 15 minutes of action of the solvent on the beans is sufficient to extract the oil, whereafter the solvent is withdrawn and is replaced by a new batch of fresh solvent to extract residual oil, although of course the circulating type of extractor may be applied with equal effect.

After one or two further treatments with solvent to insure complete removal of the fat or oil, the remaining solvent is withdrawn and that which is absorbed by the beans is removed either by blowing hot air, compressed air, a neutral gas or dry steam therethrough, this being preferably done under reduced pressure or in vacuum. It has been found that carbon dioxide gas, in the case of dichloroethylene, is an excellent medium for expelling the solvent. The object is not to overheat the residual bean material during removal of the solvent and this can be prevented by employing a vacuum equal to about 26" and a temperature of not above 170° F. in the extractor. If no vacuum is used the temperature will have to be on the order of 275° F. In using a neutral gas or compressed air, or hot air to expel the solvent, the same is passed through the usual solvent recovery apparatus to recover the solvent entrained thereby, all of this, however, being standard practice in the art. The essential feature of the invention lies in the fact that there is nothing in the beans which will tend to retain the solvent, as otherwise has been the case in the past. For example, it has hitherto been proposed on numerous occasions to treat oil-bearing seeds with alkalies such as potash, caustic soda or ordinary lye or bicarbonates. Without exception, however, in these cases, the treatment with alkali has been for the purpose of softening the seeds and it has been usually the custom to submit the seeds to a cooking operation in the presence of such a fixed alkali as sodium hydroxide. In these prior processes the alkali has remained in the seeds which have then been subjected to a pressing operation, ostensibly to squeeze oil therefrom. However, it is a notorious fact that when using alkali for such purposes that a considerable amount of oil remains in the seeds and the alkali, of course, remains therein. Inasmuch as the cell walls and cell structure of seeds consists essentially of cellulose and as cellulose has a decided tendency to combine with sodium hydroxide to form a definite compound known as soda cellulose it becomes practically impossible to remove the alkali from the seeds even if the same should be subjected to washing by enormous amounts of water. It is quite obvious that this fixed amount of alkali in the seeds after washing thereof is highly objectionable, as not only does it interfere with the product as a feeding material, but in case volatile solvents are used, the soda cellulose or possibly even hydrocellulose, appears to form a loose complex with the solvent, rendering its complete recovery a practical impossibility. It is therefore to be distinctly understood that the present invention bears no relation to the cooking of oil-bearing seeds or plants with fixed alkali for the purpose of softening the seeds, but on the contrary employs a volatile substance, specifically ammonia, which by extracting the mucilaginous material from the seed renders the same more amenable to interpenetration by the subsequently applied volatile organic solvent.

A possible explanation of the beneficial results might lie in the fact that the ammonia effects a very slight saponification of the oil in the seeds forming a small amount of ammonium soap which, as is well known, has the power of enormously lowering the surface tension of aqueous liquids. If the remaining fluid (water) in the bean has thus had its surface tension lowered, it will almost immediately emulsify in the subsequently applied organic solvent and will therefore present no hindrance to the penetration of the solvent and the dissolving of the fat. When, then, on subsequent heating the solvent is expelled, the ammonia is likewise driven off, and as the water has been previously taken out by the organic solvent in emulsified form, there is very little, if any, tendency for the seeds to retain the solvent by absorption. Predicated on the above theory it can readily be seen a distinct advance in the art of oil extraction has been made.

The further treatment of the extracted material comprises the drying thereof and possibly its subsequent grinding to make it more useful as a feed, but these steps form no part of the present invention as they are well known in the art.

The fat-containing organic solvent recovered from the treated soya beans is first run through a filter press to remove the suspended material therefrom and is then transferred to a still either with or without vacuum. The solvent is distilled in order to recover the oil or fat. It is advantageous to again filter the oil before all of the solvent is removed, as under those conditions the viscosity is much lower and clarification is much more readily effected. It is distinctly advantageous to add at this stage a filter-aid, as for example finely comminuted kieselguhr and/or some decolorizing carbon to lighten the color of the oil, followed by filtration to remove these added materials, together with the impurities entrained and entangled thereby. The filtered oil is then transferred to a second still where the balance of the solvent is removed, its final removal being aided by the introduction of either dry steam, carbon dioxide or warm air. In the case of dichloroethylene, which is an ideal solvent for the purpose, carbon dioxide has again been found to be a most excellent material to remove the last traces of the solvent from the oil.

While the above process has been described in connection with soya beans, it is to be understood that the process may be applied with practically no changes to cotton seed, either whole or decorticated, to corn germs, flax seeds, or all or any of the other vegetable or fruit seeds containing extractable fats or oils. The length of time of treatment with ammonia and the amount of solvent required, of course differs somewhat for the different seeds, but it is believed that sufficient disclosure has been made in connection with soya beans to enable those skilled in the art of oil extraction to practice the process.

The oils or fats recovered by the practice of the present process in many cases require no further refinement, but if they do, the refining process presents no serious problem as the preliminary treatment of the vegetable material has already served to remove the toxic or objectionable materials which ordinarily would enter the oil and would require complicated and extensive operations to remove them therefrom.

The present process is applicable to the recovery of residual oil in oil press-cake. In this case the press-cake is broken up mechanically and subjected to treatment with hot water and ammonia, followed by removal of the surface moisture, and extraction by a volatile solvent, much in the manner hereinabove described. The finished oil in any case may, of course, if desired, be given a final filtration to render the same brilliantly clear.

In the hereunto appended claims the term volatile alkali is to be construed as comprising such materials as ammonia, hydrazine, and soluble volatile amines, such as methylamine, although of course for commercial purposes and on account of its availability and low cost, ammonia or ammonium hydroxide are practically the only materials whose cost permits of their commercial utilization.

Applicant is aware of a number of patents that disclose roughly the idea of opening the pores of cells by means of steam or other form of heat that disrupts the cells so that the oil may be more easily dispelled therefrom. He is also aware of the use of fixed alkalies, but as already pointed out, the use of these fixed alkalies introduces complications into the process which virtually render their commercial use impracticable. No claim is made herein of the use of alkali broadly, but the claims are directed to the utilization of volatile alkali in the treatment of seeds without cooking the same, for the purpose of removing from the seeds such materials as will prevent the complete recovery of such volatile solvents as may be employed for the extraction of fats or oils therefrom.

What it is desired to protect by Letters Patent of the United States is the following:

1. The process of recovering oil from oil-bearing vegetable material which comprises treating said material at a temperature not above 180° F. with a dilute aqueous solution of ammonium hydroxide, draining the thus formed solution from said material, and thereupon subjecting the material to the solvent action of a volatile organic fat solvent to dissolve the oil therein.

2. The process of recovering oil from oil-bearing vegetable material which comprises subjecting said material at a temperature not above 180° F. to the action of a dilute solution of ammonium hydroxide, draining the resultant ammoniacal solution from the material, superficially drying the material, treating the same with an organic volatile fat-solvent, withdrawing said solvent and recovering dissolved oil therefrom by distillation of said solvent.

3. In the process of extracting oil from vegetable materials by volatile organic solvents, the step which comprises treating said materials below the boiling point of water with a dilute solution of ammonium hydroxide.

4. The process of recovering oil from soya beans which comprises treating the same at a temperature not above 180° F. with an aqueous solution of ammonium hydroxide, draining the thus formed solution from said beans and thereupon subjecting the same to a volatile organic fat solvent.

In witness whereof, I have hereunto subscribed my name.

F. PETER DENGLER.